Jan. 29, 1946. R. L. WILCOX 2,393,850
METHOD AND MEANS FOR MAKING NUT BLANKS
Filed Dec. 19, 1944 3 Sheets-Sheet 1

Inventor
Richard Lester Wilcox
By Rockwell & Buchholz
Attorneys

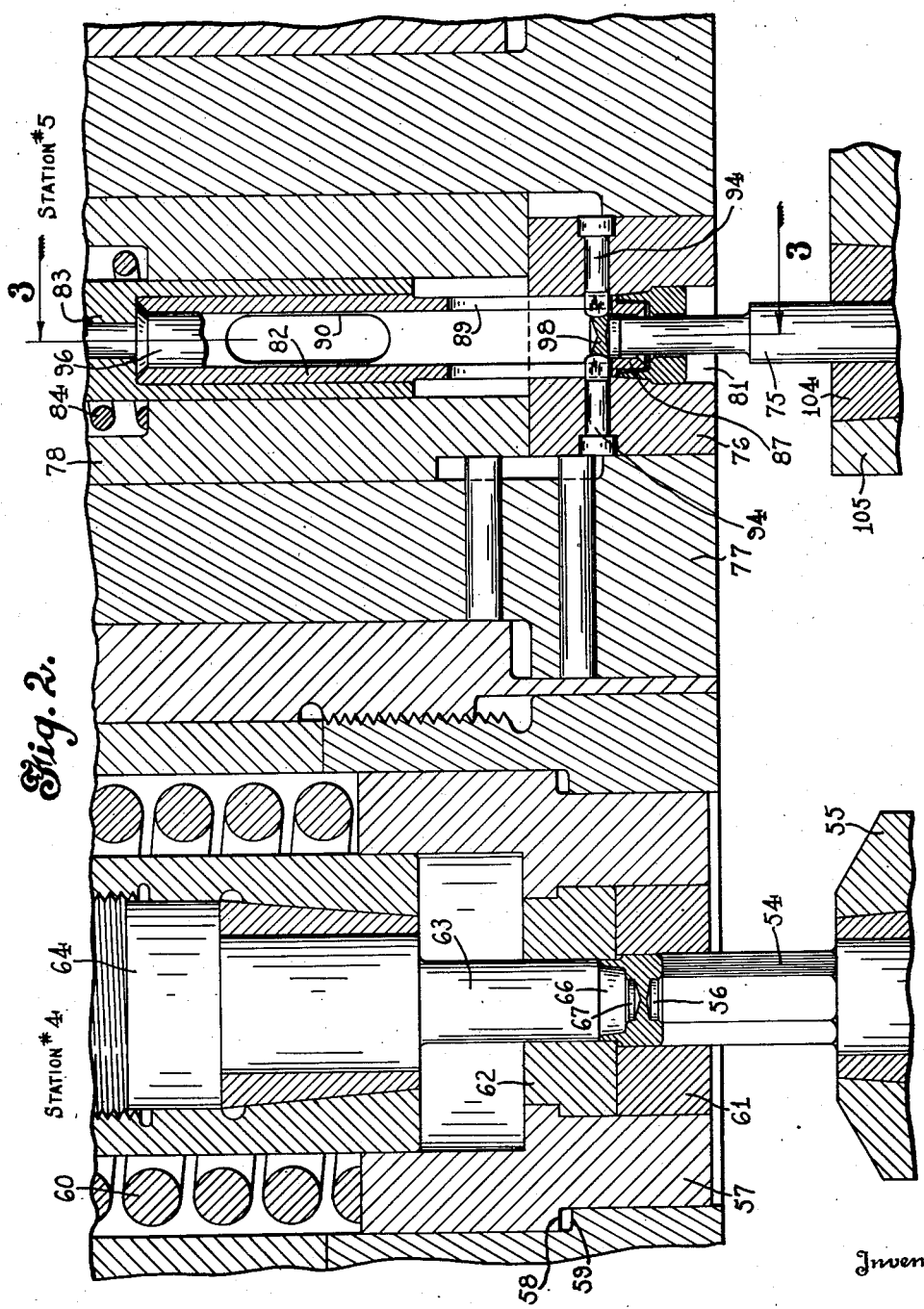

Jan. 29, 1946.   R. L. WILCOX   2,393,850
METHOD AND MEANS FOR MAKING NUT BLANKS
Filed Dec. 19, 1944   3 Sheets-Sheet 3
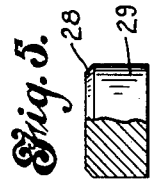
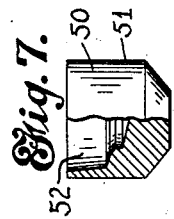
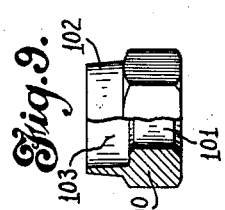
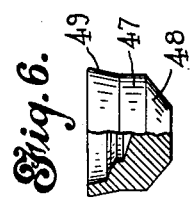
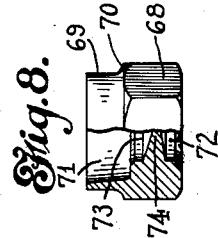
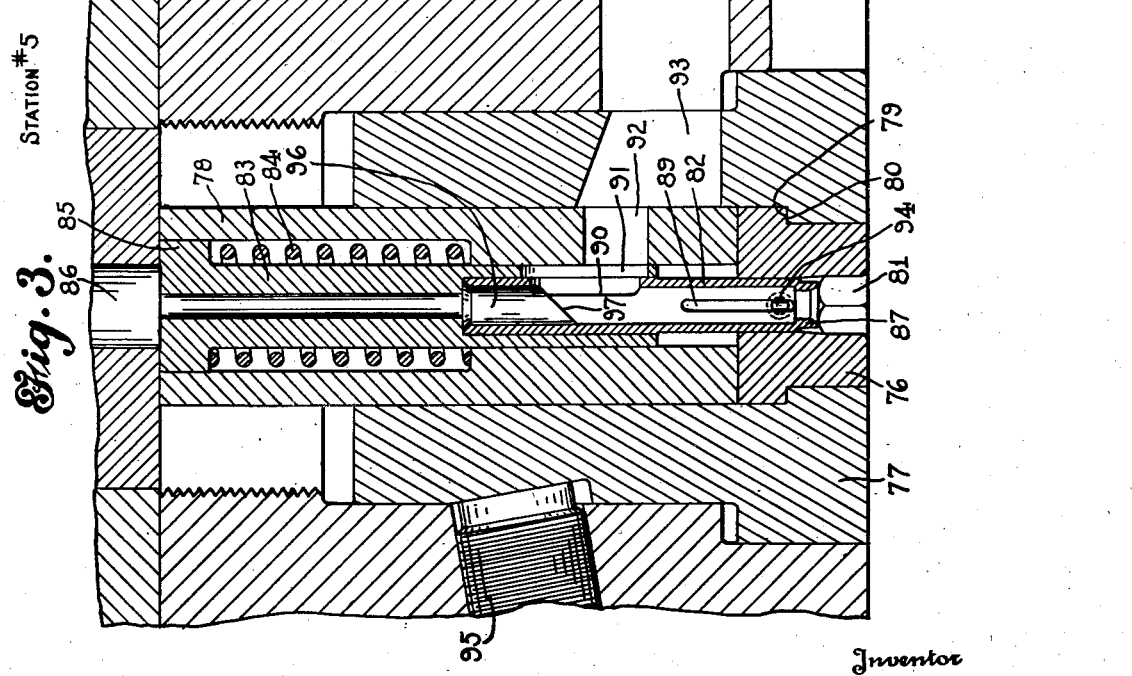

Patented Jan. 29, 1946

2,393,850

UNITED STATES PATENT OFFICE 2,393,850

METHOD AND MEANS FOR MAKING NUT BLANKS

Richard Lester Wilcox, Waterbury, Conn., assignor to The Waterbury Farrel Foundry & Machine Company, Waterbury, Conn., a corporation of Connecticut Application December 19, 1944, Serial No. 568,801

21 Claims. (Cl. 10—78)

This invention relates to a method of forming nut blanks, and to a new and improved machine for carrying out the novel method. Although not limited to a particular form of nut blank, I have illustrated my improvements as applied to a nut having a lower portion of polygonal shape and an upper portion having a recess therein surrounded by a skirt which, as shown, is cylindrical in form.

As illustrated, the nut blank is formed from a piece of solid bar stock from which a workpiece is cut at the beginning of the operation. This workpiece is then fed through the machine by suitable transfer mechanism, where it is acted upon at a number of stations in sequence at which various operations are performed on the workpiece until the finished blank is produced at the last station. The operations performed by the machine, and during the improved process here illustrated, consist generally in sizing or squaring up the workpiece, indenting one face thereof while coning or beveling the opposite face, then forming polygonal faces upon the exterior of the workpiece at the end thereof opposite the indentation or recess, and thereafter piercing an opening through the blank, which may later be threaded.

These operations are performed upon a machine of the header type, in which a die block serves to support or carry a plurality of dies, and a reciprocable gate, movable toward and from the die block, carries suitable tools to cooperate with the dies to perform the desired operations upon the workpiece.

One feature of the present invention is the formation of finished and relatively sharp shoulders upon the workpiece as it passes through the machine, and more particularly at the station at which the hexagonal faces are formed upon the workpiece. This operation is performed in a die movably mounted in the die block, so that after the workpiece has been forced into the die opening by a suitable punch, the punch and die may be moved forward together, thus forcing the nut against a suitable tool, which operation enables the filling out of the corners of the polygonal portion of the nut adjacent the bottom of the cylindrical skirt. As will be apparent from the description as it proceeds, this filling out of the corners on the outer surface of the workpiece enables the latter at a subsequent station to be held by these corners while further operations are performed thereon.

A further feature of the invention is the novel method of and mechanism for piercing the workpiece to form the opening therethrough, and disposing of the slug removed from the workpiece by the piercing tool, as well as disposing of the finished blank.

To these and other ends the invention consists in the novel features and combinations of parts to be hereinafter described and claimed.

In the accompanying drawings:

Fig. 2 is an enlarged view of the cooperating tools and dies at two of the stations in the machine;

Fig. 3 is a sectional view on line 3—3 of Fig. 2; and

Figure 1:
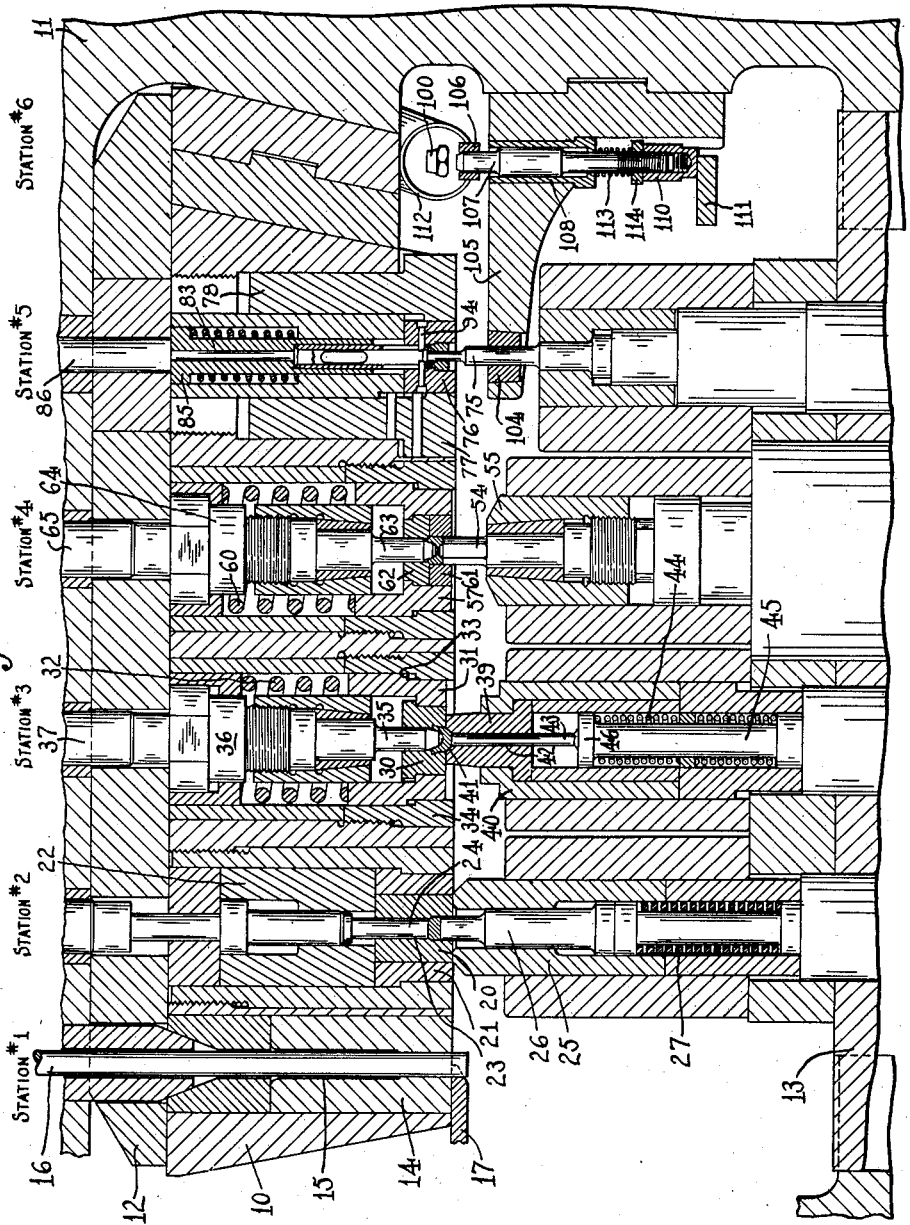
Fig. 1 is a partial sectional view of a machine of the header type, embodying my improvements and designed to carry out my improved process.

Figs. 4 to 9, inclusive, are views, partly in elevation and partly in section, showing the workpiece as it appears at various stations in the machine after various operations are performed thereon.

In Fig. 1 of the drawings I have shown a machine of the header type comprising a die block 10 mounted in the frame 11 of the machine, the die block being supported by a backing member 12. Movably mounted in the frame 11 is a gate 13 designed to be reciprocated to and from the die block, as is usual in machines of this type, the gate being provided with a number of tools which cooperate respectively with a plurality of dies in the die block, as will be hereinafter explained.

At one end of the machine, designated on the drawing as station #1, a die 14 is mounted in the die block 10, this die being provided with an opening 15 through which a piece of bar stock 16 may be inserted so that the end of the piece of stock will protrude from the die to be severed by a cut-off tool 17, this severed end becoming the workpiece 18 shown in Fig. 4 of the drawings.

This workpiece is then advanced by suitable transfer mechanism (not shown) to station #2, at which station a suitable die 20 is mounted in a die holder 21 and held against movement by a backing sleeve 22. This die 20 is provided with an opening 23 within which is a stationary tool 24 closing the rear end of the opening.

In the gate 13 opposite the die 20 is mounted a punch holder 25 within which is movably mounted a punch 26, the latter being urged forwardly by a spring 27. As will be apparent from Fig. 1 of the drawings, when the gate is moved toward the die block, the workpiece which has been cut from the length of stock will be forced into the opening in the die 20 against the tool 24, and it will be squared up so that both faces will extend at right angles to the axis of the blank. The opening within the die 20 may be slightly coned at its rear end, or the end adjacent the tool 24, so that the rear face of the workpiece may be slightly coned at this point, as shown more particularly at 28 in Fig. 5, on the workpiece 29. This figure of the drawings illustrates the shape of the workpiece after being acted upon at station #2.

At station #3 in the machine a die 30 is secured in a holder 31 movably mounted in the die block 10 and urged outwardly by a relatively strong spring 32, the die holder 31 being provided with a shoulder 33 abutting against a cooperating shoulder on a fixed sleeve 34 to limit forward movement of the die and die holder by the spring 32. The die 30 is also provided with an opening into which projects a punch or tool 35 secured to a tool holder 36, which is designed to be advanced by a pin 37 to eject the work from the die after the completion of a forward stroke of the gate.

As will be apparent from Fig. 1 of the drawings, the die 30 is provided with an opening which is slightly flared at its inner end, and the outer end of the punch or tool 35 is of the shape of a frustum of a cone, and is of smaller size than the die opening so that the blank at this station will be indented and a skirt formed thereon around the indentation.

The gate at this station is provided with a punch 39 mounted in a punch holder 40, the punch being provided with a recess 41 in its front end and an opening 42 communicating with this recess in which is movably mounted a pin 43 urged forwardly in the gate by a spring 44, which surrounds an enlarged head 45 on the pin and acts against the shoulder 46.

Two operations are performed upon the workpiece at this station in the machine, as shown in Figs. 6 and 7 of the drawings. It will be understood that when the gate is in its rear or retracted position, the pin 43 will be projected forwardly from the punch 39 by the spring 44. As the workpiece 29 is brought to this station by the transfer mechanism, and the gate is moved forwardly toward the die, this pin will engage the workpiece and hold it during withdrawal of the transfer mechanism. Upon further movement of the gate the punch 39 will engage the workpiece and force it into the die opening, the retraction of the pin being permitted by the spring 44. Upon further advance of the gate, and after the punch has made contact with the outer surface of the die 30, the punch and die will be moved rearwardly together, the die opening being closed by the punch, until the parts are in the position shown in Fig. 1, in which the workpiece has been moved against the then stationary tool 35.

The workpiece will at this time be in the form shown at 47 in Fig. 6. It will be noted that the lower end of the workpiece has been coned or tapered, as shown at 48, by being forced into the recess in the face of the punch, and that the opposite face of the workpiece has been indented and a relatively deep recess formed therein by the tool 35, the wall or skirt portion 49 about this recess being flared outwardly to some extent beyond the wall of the body portion of the blank.

The gate is now withdrawn or retracted and the knock-out pin 37 advanced to cause the tool or punch 35 to strip the workpiece from the die. During this stripping operation the flared wall 49 of the workpiece is drawn to cylindrical shape, as shown at 50 in Fig. 7, the blank being shown at 51 in this figure in the form in which it comes from the die. It may also be noted that the recess 52 in the blank at this stage in its manufacture is somewhat deeper than as shown in Fig. 6 at the completion of the previous step.

The workpiece or blank is now moved to station #4. At this station a suitable punch 54 is mounted in a punch holder 55 in the gate 13, the punch 54 being of polygonal shape and provided with an indenting projection 56 upon its forward end. A die holder 57 is movably mounted in the die block 10 at this station, the die holder being provided with a shoulder 58 designed to abut a cooperating shoulder 59 upon a part of the block to limit forward movement of the holder. A relatively strong spring 60 urges the holder forwardly in the die block against the shoulder 59. Secured in the die holder 57 are cooperating die members 61 and 62, these members having cooperating openings the outer one of which is hexagonal in form and the inner one circular in form. Extending into the openings in the die members 61 and 62 is a tool 63 secured in a tool holder 64 designed to be moved forwardly by a knockout pin 65. It will be noted from Fig. 2 of the drawings that the punch or tool 63 is provided with a tapered portion 66 adjacent its end, and an indenting projection 67 upon its end, so as to perform proper operations upon the workpiece at this station.

When the workpiece has been carried to station #4 and the gate is moved forwardly, the punch 54 forces the workpiece 51 into the openings in die members 61 and 62. During the initial part of this movement the die holder 57 is held in its outward position by the spring 60. However, when pressure is applied to the workpiece by the punch 54, tending to expand it into the hexagonal die opening and form polygonal faces upon the blank, the dies and die holder move inwardly to some extent with the punch, thus effecting the filling out of the corners between the polygonal faces adjacent the cylindrical skirt portion surrounding the recess. I have discovered that when this operation is attempted with a fixed die the metal of the workpiece, upon expanding and flowing laterally, will impinge upon the polygonal faces of the die opening so as to retard the flow of metal at points remote from the punch, and thus prevent the filling out of the corners between the polygonal faces at the base of the skirt. With the use of a movable die, however, when the metal contacts the faces of the polygonal opening the die travels with the punch and causes the metal to flow more readily to these corners when the workpiece is carried against the stationary tool 63.

Also at this station it will be apparent that indentations are made in the forward face of the workpiece by the punch, and also at the bottom of the recess by the tool 63 so as to leave a web portion therebetween to be later punched out to form an opening through the blank.

The workpiece or blank, as it is formed at station #4, is shown in Fig. 8 of the drawings, and it will be noted that, as shown in this figure, the blank is provided with a polygonal lower portion 68 having relatively flat faces thereon, and an upper cylindrical skirt portion 69 with relatively sharp, well-filled corners 70 between these portions. Moreover, it will be noted that the interior of the wall 69 surrounding the recess 71 is slightly flared, the recess being larger at its open end than at its base. The exterior surface of the skirt or wall 69 is, however, substantially parallel with the axis of the recess, thus rendering the wall itself slightly thinner at its upper end than at its lower end. It will also be noted that indentations 72 and 73 are formed in the body portion of the nut, leaving the web 74 therein.

The workpiece is now transferred to station #5, shown in Figs. 1, 2 and 3 of the drawings. At this station a piercing punch 75 is secured in the gate 13 so as to be moved with the gate toward the die block. In the die block at this station is provided a die 76 secured in a die holder 77 against a backing block 78. As shown in Fig. 3, the die may be provided with shoulders 79 abutting cooperating shoulders 80 on the die holder to prevent the die being moved forwardly during the operation of the machine. The die is provided with an opening 81 of the proper shape to receive the workpiece shown in Fig. 8, the opening having a polygonal outer portion and a cylindrical slightly tapered inner portion. Reciprocably mounted in the backing block 78 is a knock-out sleeve 82, this sleeve being mounted in a sleeve holder 83 urged rearwardly within the block 78 by a spring 84. The sleeve holder 83 is provided with a head 85 against which impinges a knock-out pin 86 to drive the holder and sleeve forwardly at the proper time to eject the nut from the die.

This sleeve is provided at its lower end with a reduced cylindrical portion 87 designed to enter the recess 71 of the blank, and it will be understood that the opening in the sleeve is of sufficient size to freely receive the end of the piercing punch 75. Also at the lower end of the sleeve 82 are provided a pair of oppositely disposed elongated openings or slots 89, and beyond these slots this sleeve is provided with a discharge opening 90 registering with an opening 91 in the sleeve holder 83, an opening 92 in the backing block 78, and an opening 93 in the die holder 77 to permit ejection of the slugs pierced from the workpiece at this station.

Secured in the die member 76 and extending through the openings 89 in the sleeve 82 are a pair of pins 94, these pins being disposed at the outer ends of the openings 89 when the knock-out sleeve is in its rearmost position. The die holder 77 may be held in place by means of the set screw 95 (Fig. 3). Within the sleeve 82 is a plug 96 having a beveled end 97 designed to assist in ejection of the slugs from the sleeve, as will be hereinafter explained.

When the workpiece or blank has been moved to station #5, and is forced into the die opening 81 by the piercing punch 75, it is held in position in the opening by the shoulders 70, which, as has been previously described, are sharply formed and well filled out for this purpose. No part of the punch against the blank is borne by the sleeve 82, the blank being held in the die opening by the engagement of these external shoulders. Further advance of the punch serves to pierce the blank or cut the web 74 therefrom in the form of a slug, shown at 98 in Fig. 2. The movement of the punch 75 is sufficient to force the slug 98 between the pins 94, where it is caught and held against return with the punch upon withdrawal of the gate.

When the gate is withdrawn, the knock-out sleeve 82 is advanced by means of the pin 86, which serves to eject the blank from the die. The advance of the sleeve is permitted by the elongated slots 89 through which the pins 94 project. Upon a subsequent operation of the machine, when a second slug 98 is pierced from a blank, the first slug will be forced beyond the pins 94 into the sleeve 82, and during subsequent operations these slugs will be discharged from the machine through the openings 90, 91, 92 and 93. Should these slugs stick together, they will be broken up by the tapered end 97 of the sleeve plug 96 and fall out by gravity through the openings.

The finished blank is shown in Fig. 9 at 100, where it will be noted an opening 101 is formed entirely through the body portion thereof. It will also be noted that the flare of the wall or skirt, as shown at 69 in Fig. 8, is reversed in Fig. 9, as shown at 102. In other words, the outer surface of this wall is now slightly tapered inwardly toward its upper end, while the inner surface of the skirt defining the recess 103 is substantially cylindrical or parallel with the axis of the recess. This slight inward displacement of the skirt is effected when the blank is forced into the die 76 by the piercing punch.

While in most instances the blank will remain in the die at station #5, to be ejected by the sleeve 82, it may happen that it will sometimes be stripped from the die with the withdrawal of the punch 75, and remain on the punch. I have, therefore, provided a stripping sleeve 104 mounted in a stationary arm 105 secured to a part of the frame 11 of the machine, this sleeve being provided with an opening through which the punch moves. Thus provision is made for stripping the blank either from the die or from the punch.

The blank as it comes from station #5 is in its finished form. In order to dispose of the finished nut I also provide transfer mechanism to carry it from station #5 to a knock-out station #6, shown on Fig. 1. These transfer fingers are shown diagrammatically at 106, and it is necessary to provide means for removing the completed blank from these fingers. For this purpose a knock-out pin 107 is movably mounted in a sleeve 108 in the arm 105. This sleeve is provided with an adjustable cap 110 at its rear end, which cap is designed to be engaged by an actuating arm 111 attached to the gate of the header, so that as the gate moves forwardly the knock-out pin 107 will be projected between the transfer fingers and eject the nut therefrom, the latter falling through a suitable conveyor pipe 112 to any desired place of delivery. The pin 107 is normally held in a rear or retracted position by a spring 113, which acts against the fixed sleeve 108 at one end and against a lock nut 114 on the knock-out pin, this nut also serving to hold the cap 110 in its adjusted position.

While I have shown and described a preferred embodiment of my invention and a preferred method of carrying out my improved process, it will be understood that the invention is not to be limited to all the details shown, nor the process limited to the particular steps described, but both are capable of modification and variation within the spirit of the invention and the scope of the claims.

What I claim is:

1. The method of making a nut blank which comprises cutting a workpiece from a length of bar stock, forming in one end of the workpiece a recess surrounded by a cylindrical skirt, and then forcing the workpiece into a polygonal opening in a movable die and against and around a stationary tool to form polygonal faces on the body of the workpiece and deepen the recess therein.

2. The method of making a nut blank which comprises cutting a workpiece from a length of bar stock, forming in one end of the workpiece a recess surrounded by a cylindrical skirt, forcing the workpiece into a polygonal opening in a movable die by means of a punch, and then moving the punch and die to force the work against and around a stationary tool to deepen the recess and fill out the corners between the faces on the body of the workpiece adjacent the skirt.

3. The method of making a nut blank which comprises cutting a workpiece from a length of bar stock, forming in one end of the workpiece a recess surrounded by a cylindrical skirt by forcing the workpiece into an opening in a movable die by a punch having a conical recess in its outer end, and then moving the punch and die forwardly to force the work against and around a stationary tool to simultaneously cone one end of the blank and form a recess in the other end thereof.

4. The method of forming a nut blank from a workpiece having a cylindrical body portion, which comprises the steps of forcing said workpiece into a polygonal opening in a movable die by means of a punch, then moving both punch and die to force the work against and around a stationary tool to form polygonal faces on the body of the workpiece and fill out the shoulders between said faces at the ends thereof remote from the punch.

5. The method of forming a nut blank from a workpiece having a cylindrical body portion, which comprises the steps of forcing said workpiece into a polygonal opening in a movable die by means of a punch, then moving both punch and die as a unit toward a stationary tool having a reduced outer end to force the work against and around the tool and form polygonal faces on the body of the workpiece, with sharply defined corners between said faces at the ends thereof remote from the punch.

6. A machine for forming nut blanks comprising a movably supported die holder, a die carried thereby having an opening therein, said opening having an outer portion of polygonal shape and an inner circular portion, a relatively stationary tool closing the inner end of the die opening, said tool having a recess-forming portion at its outer end, and a punch cooperating with said die and tool.

7. A machine for forming nut blanks comprising a movably supported die holder, a die carried thereby having an opening therein, said opening having an outer portion of polygonal shape and an inner circular portion, a relatively stationary tool closing the inner end of the die opening, said tool having a recess-forming portion at its outer end, a punch cooperating with said die and tool, and means urging said die outwardly toward the punch.

8. The method of making a nut blank which comprises forming a workpiece having a recess in one end surrounded by a skirt portion and polygonal outer faces adjacent the other end with shoulders between said faces and skirt portion, and piercing an opening in the workpiece while holding it by said shoulders.

9. The method of making a nut blank which comprises forming a workpiece having a substantially solid body portion with polygonal faces, an end portion provided with a recess surrounded by a skirt, and projecting shoulders between said skirt and faces, and piercing an opening in the workpiece while holding it against movement by said shoulders.

10. The method of making a nut blank which comprises forming a workpiece having a substantially solid body portion with polygonal faces, an end portion provided with a recess surrounded by a skirt, and projecting shoulders between said skirt and faces, forcing said workpiece into a die opening against said shoulders, piercing an opening through the body portion of the workpiece, and then advancing a knock-out sleeve to eject the blank from the die.

11. The method of making a nut blank which comprises forming a workpiece having a substantially solid body portion with polygonal faces, an end portion provided with a recess surrounded by a skirt, and projecting shoulders between said skirt and faces, forcing said blank into a die opening against said shoulders, advancing a punch to pierce a slug out of the body portion of the workpiece to provide an opening therein, and holding said slug against return movement with the punch.

12. Mechanism for forming an opening in a nut blank having a recess in one end, comprising a die having an opening to receive the blank, a reciprocable punch movable into the die to remove a slug from the blank, and a sleeve member adapted to enter a recess in the blank and receive the punched-out slug.

13. Mechanism for forming an opening in a nut blank having a recess in one end, comprising a die having an opening to receive the blank, a reciprocable punch movable into the die to remove a slug from the blank, a sleeve member adapted to enter a recess in the blank and receive the punched-out slug, and means within said sleeve to engage the slug and hold it against return movement with the punch.

14. Mechanism for forming an opening in a nut blank having a recess in one end, comprising a die having an opening to receive the blank, a reciprocable punch movable into the die to remove a slug from the blank, and a sleeve member adapted to enter a recess in the blank and receive the punched-out slug, said sleeve having a lateral opening therein through which the slug is discharged.

15. Mechanism for forming an opening in a nut blank having a recess in one end, comprising a die having an opening to receive the blank, a reciprocable punch movable into the die to remove a slug from the blank, a sleeve member adapted to enter a recess in the blank and receive the punched-out slug, and means for advancing the sleeve to strip the blank from the die.

16. Mechanism for forming an opening in a nut blank having a recess in one end, comprising a die having an opening to receive the blank, a reciprocable punch movable into the die to remove a slug from the blank, a sleeve member adapted to enter a recess in the blank and receive the punched-out slug, and means within said sleeve to engage the slug and retain it against return movement with the punch, and said sleeve having a lateral opening therein rearwardly of said means through which the slug is discharged upon subsequent operations of the mechanism.

17. Mechanism for forming an opening in a nut blank having a recess in one end, comprising a die having an opening to receive the blank, a reciprocable punch movable into the die to remove a slug from the blank, a sleeve member adapted to enter a recess in the blank and receive the punched-out slug, and means within said sleeve to engage the slug and retain it against return movement with the punch, said sleeve having a lateral opening therein rearwardly of said means through which the slug is discharged upon subsequent operations of the mechanism, and said sleeve being movable through the die opening to strip the blank from the die.

18. The method of making a nut blank which comprises forming a workpiece having a body portion and a recess in one end surrounded by a skirt, which comprises holding the workpiece against movement in a die opening by means engaging the outer surface of the wall of the workpiece and advancing a punch to pierce a slug from the body portion thereof while it is so held.

19. The method of making a nut blank which comprises forming a workpiece having an external shoulder thereon intermediate its ends, and holding the workpiece against movement in a die by said shoulder while piercing a slug therefrom to form an opening therein.

20. Mechanism for forming an opening in a nut blank having a recess in one end, comprising a die having an opening to receive the blank, a reciprocable punch movable into the die to remove a slug from the blank, a sleeve member adapted to enter a recess in the blank and receive the punched-out slug, and means within said sleeve to engage the slug and hold it against return movement with the punch, said means being fixed with respect to the die.

21. The method of forming a nut blank which comprises forming a workpiece having a body portion and a recess in one end, piercing a slug from the body portion of the blank to form an opening therein while holding the blank in a die, ejecting the blank from the die into engagement with transfer means, and then advancing a tool to remove the blank from said transfer means.

RICHARD LESTER WILCOX.